United States Patent
Shores et al.

(10) Patent No.: US 7,142,537 B2
(45) Date of Patent: Nov. 28, 2006

(54) INTERFACE CALL SIGNALING PROTOCOL

(75) Inventors: William N. Shores, Phoenix, AZ (US); Barbara M. Desutter, Phoenix, AZ (US); Thomas G. Hallin, Wheaton, IL (US); Edward J. Neyens, Scottsdale, AZ (US); Robert J. Thomas, Phoenix, AZ (US)

(73) Assignee: Motorola, Inc., Schaumburg, IL (US)

( * ) Notice: Subject to any disclaimer, the term of this patent is extended or adjusted under 35 U.S.C. 154(b) by 88 days.

(21) Appl. No.: 10/739,801

(22) Filed: Dec. 18, 2003

(65) Prior Publication Data

US 2005/0135386 A1 Jun. 23, 2005

(51) Int. Cl.
*H04L 12/28* (2006.01)

(52) U.S. Cl. ............... 370/389; 709/227; 709/228; 713/151

(58) Field of Classification Search ............ 370/260, 370/389, 401; 709/227, 228, 229; 713/151
See application file for complete search history.

(56) References Cited

U.S. PATENT DOCUMENTS

| | | | | |
|---|---|---|---|---|
| 6,822,957 | B1* | 11/2004 | Schuster et al. | 370/389 |
| 6,910,068 | B1* | 6/2005 | Zintel et al. | 709/220 |
| 2002/0129236 | A1* | 9/2002 | Nuutinen | 713/151 |
| 2003/0012149 | A1* | 1/2003 | Maggenti et al. | 370/260 |
| 2003/0012170 | A1* | 1/2003 | Vassilovski et al. | 370/342 |
| 2004/0249951 | A1* | 12/2004 | Grabelsky et al. | 709/227 |
| 2005/0286542 | A1* | 12/2005 | Shores et al. | 370/401 |

OTHER PUBLICATIONS

Donovan, S. The SIP Info Method. [Online] Available http://www.nsr.labs.mot.com/rfc/rfc29xx/rfc2976.html.gz, Aug. 11, 2005, RFC 2976 Dec. 2002 Oct. 2000.

Schulzrinne, H. et al. The Reason Header Field for the Session Initiation Protocol (SIP). [Online] Available http://www.nsr.labs.mot.com/rfc/rfc33xx/rfc3326.html.gz, Aug. 11, 2005, RFC 3326.

Handley, M. et al. SDP: Session Description Protocol. [Online] Available http://nsr.labs.mot.com/rfc/rfc23xx/rfc2327.html.gz, Aug. 11, 2005, RFC 2327 Apr. 1998.

Schulzrinne, H. et al. RTP: A Transport Protocol for Real-Time Applications. [Online] Available http://nsr.labs.mot.com/rfc/rfc18xx/rfc1889.html.gz, Aug. 11, 2005, RFC 1889.

Schulzrinne, H. RTP Profile for Audio and Video Conferences with Minimal Control. [Online] Available http://nsr.labs.mot.com/rfc/rfc18xx/rfc1890.html.gz, Aug. 11, 2005, RFC 1890.

Li, A. RTP Payload Format for Enhanced Variable Rate Codecs (EVRC) and Selectable Mode Vocoders (SMV). [Online] Available http://nsr.labs.mot.com/rfc/rfc35xx/rfc3558.html.gz, Aug. 11, 2005, RFC 3558.

(Continued)

*Primary Examiner*—Doris H. To
*Assistant Examiner*—Robert W. Wilson
(74) *Attorney, Agent, or Firm*—Frank J. Bogacz; Kevin D. Wills (57) ABSTRACT

A third generation (3G) gateway provides the facilities for extending a number of internet protocols between a second generation (2G) network and a 3G network. The various messages of a session initiation protocol (SIP) are extended to provide user identification and server identification subfields. The SIP message extensions facilitate the communication of 2G and 3G networks for the purposes of implementing push-to-talk and dispatch service features.

15 Claims, 5 Drawing Sheets

OTHER PUBLICATIONS

Rosenberg, J. SIP: Session Initiation Protocol. [Online] Available http://nsr.labs.mot.com/rfc/rfc32xx/rfc3261.html.gz, Aug. 11, 2005.

Donovan, S. The SIP Info Method. [Online] Available http://nsr.labs.mot.com/rfc/rfc29xx/rfc2076.html.gz, Aug. 11, 2005, RFC 2976.

Freed, N. Multipurpose Internet Mail Extensions (MIME) Part One: Format of Internet Message Bodies. [Online] Available http://nsr.labs.mot.com/rfc/rfc20xx/rfc2045.html.gz, Aug. 11, 2005.

Freed, N. Multipurpose Internet Mail Extensions (MIME) Part Two: Media Types. [Online] Available http://nsr.labs.mot.com/rfc/rfc20xx/rfc2046.html.gz, Aug. 11, 2005.

Handley, M. et al. SIP: Session Initiation Protocol. [Online] Available http://nsr.labs.mot.com/rfc/rfc25xx/rfc2543.html.gz, Aug. 11, 2005, RFC 3261 & RFC 2543.

Hinden, R. IP Version 6 Addressing Architecture. [Online] Available http://nsr.labs.mot.com/rfc/rfc23xx/rfc2373.html.gz, Aug. 11, 2005.

* cited by examiner

INTERFACE CALL SIGNALING PROTOCOL

BACKGROUND OF THE INVENTION

The present invention pertains to communication systems, and more particularly, to an interface protocol arrangement between third generation (3G) networks and second generation (2G) networks.

Communication control in communication systems is achieved by transmitting control information between the communicating networks. Of course, bearer traffic speech and data samples are transmitted. However, control of how the bearer traffic is transmitted and received and handled is achieved by communication between the networks themselves.

The control information exchanged between communication networks is achieved by using a protocol. A protocol is an ordered set of information sent by the transmitting network and received by the receiving network. This protocol information is standardized so that all networks may interact with other networks. Typical protocols used by communication networks are based on various Internet Engineering Task Force (IETF) standards. Communication networks know the type of network with which they are in communication. Certain networks may be of a peculiar variety or an older type and are not suitable for using the IETF standards protocol. Particularly, the IETF standards are not inherently capable of supporting an iDEN interworking requirement.

IETF standards are typically documented in request for comments (RFCs), which define particular signaling protocols. Present RFCs will not permit interfacing with 2G iDEN networks using session initiation protocol (SIP).

Accordingly, it would be highly desirable to have session initiation based protocols for interworking second generation communication networks with third generation communication networks.

PREFERRED EMBODIMENT OF THE INVENTION

Figure 1:
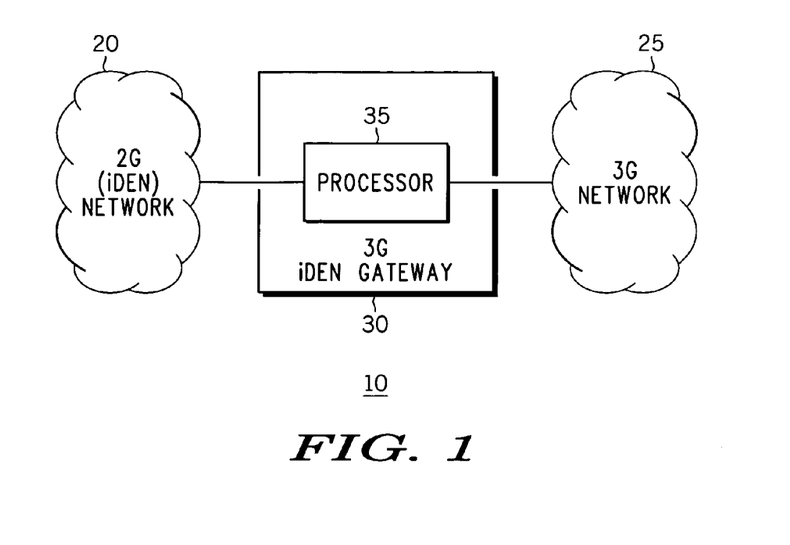
FIG. 1 is a block diagram of a communication system for providing interface call signaling protocols in accordance with the present invention.

FIG. 1 depicts a communication system 10 including the interconnection of 2G (second generation) network 20, such as an iDEN network coupled to a 3G (third generation) network 25 via a third generation 3G iDEN gateway 30. Coupled to 2G network 20 is 3G iDEN gateway 30. Third generation (3G) iDEN gateway 30 is coupled to the 3G network 25.

Third generation iDEN gateway 30, among other functions, provides for protocol conversions between the 2G network 20 and the 3G network 25. Software of processor 35 of 3G IDEN gateway 30 controls the protocols and their extensions that will be explained herein. New call signaling protocols to facilitate the extension of iDEN dispatch call services will be shown. These extensions extend the iDEN dispatch call services to external networks such as 3G networks.

These interfaces between 2G and 3G networks are based on the use of Session Initiation Protocol (SIP) and related protocols. These base protocols are shown in Request for comments (RFC 3261) SIP Session Initiation Protocol-used for call establishment. Further, the present invention is built upon Session Description Protocol, Real-time Transport Protocol, and companion standards, involving extensions to the following IETF RFCs:

RFC 2976—SIP INFO Method (used for talker arbitration);

RFC 3326—The Reason Header for the Session Initiation Protocol (SIP);

RFC 2327—SDP: Session Description Protocol;

RFC 1889—A Transport Protocol for Real-Time Applications;

RFC 1890—RTP Profile for Audio and Video Conferences with Minimal Control; and

RFC 3558—RTP Payload Format for Enhanced Variable Rate Codecs (EVRC) and Selectable Mode Vocoders (SMV).

Although SIP is used to explain the invention, the concept of using protocol extensions to define new parameters and functions to enable 2G to 3G network interworking is not constrained to the use of SIP, SDP, etc.

SIP comprises several message types (requests and associated responses), each containing a variety of information elements: Request-line or Response-line, assorted mandatory and optional headers, an optional message body, and underlying parameters/fields. RFC 3261 (extended by RFCs 2976 & 3326) specifies the syntax, semantics and methods (i.e., functional behaviors) associated with each of these information elements. Building on that foundation, this invention defines the applicable SIP extensions, organized by message type. The affected message types are:

SIP INVITE Request;
SIP 301 Response (i.e., response to INVITE Request);
SIP 302 Response (i.e., response to INVITE Request);
SIP 200 Response (i.e., response to INVITE Request);
SIP 4xx-6xx Responses (i.e., response to INVITE Request);
SIP ACK Request;
SIP INFO Request; and
SIP BYE Request.

For each distinct SIP message type, an illustrative example of the basic message structure, identifying the associated headers and message bodies, in accordance with the RFC specifications with the protocol extensions is shown.

Figure 2:
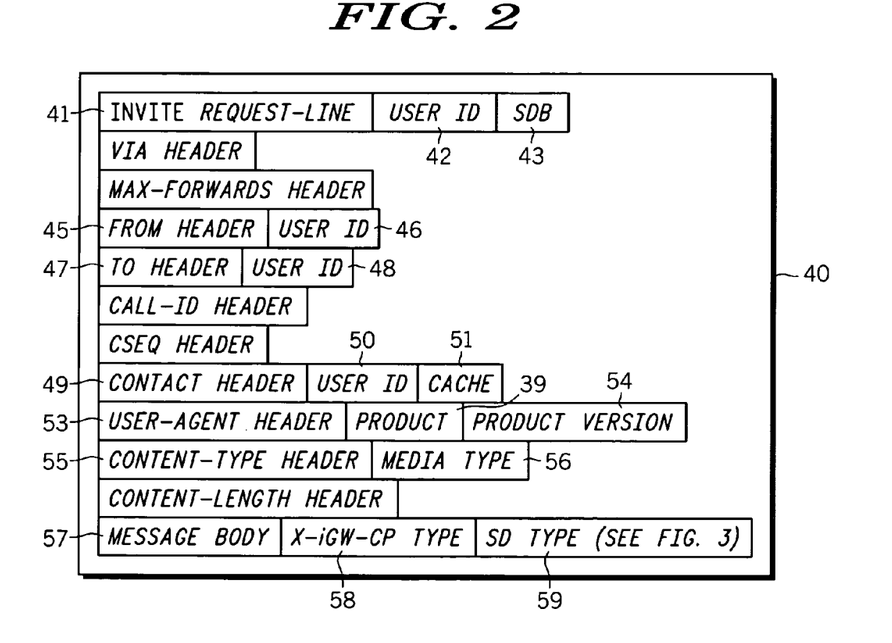
FIG. 2 is a data structure layout of a SIP INVITE request in accordance with the present invention.

Referring to FIG. 2, a data layout of a SIP INVITE request structure 41 is shown. The standard INVITE request-line has the form: INVITE Request/Uniform Resource Identifier (URI)/SIP-Version. The URI is used in various IP based protocols to denote the address of a resource or user and has the form username@host-server). There are two extensions to the INVITE request line.

First, a user information field (user id) 42 of the associated URI address may include a username of the form user_id-.non_sip_server_id to facilitate direct routing to a target server that is not SIP enabled, without requiring a separate routing table lookup. For the gateway 30 implementation, the non_sip_server_id portion of field 42 is the ISDN (Integrated Services Digital Network) address (e.g., telephone number) of the dispatch call server that is serving the target subscriber.

Second, an extension of a sdb flag 43 (subscriber database) is added. This parameter acts as a flag to indicate that the associated non_sip_server_id portion of field 42 was determined via a query to the applicable subscriber database (e.g., the target subscriber's HLR (home location register)) on this call attempt.

This implies that a preceding database query triggered a SIP 302 redirect message, resulting in this INVITE request. The sdb parameter is used to override normal cache precedence rules, eliminate unnecessary additional subscriber database queries, and mitigate SIP redirect loops.

Examples of the syntax for the first and second extensions respectively are.

INVITE 123*45*678.14805551212@carrier.com SIP/2.0
INVITE    123*45*678.14805551212@carrier.com;sdb SIP/2.0

The SIP INVITE 40 From header 45 is also extended to include the originating subscriber's private number, which is used as their address within the iDEN system (i.e., their UFMI (Universal Fleet Mobile Identifier), a "Private Number" that is assigned to each iDEN subscriber to facilitate dispatch services). This information is provided in the username information field (user id) 46 of the associated SIP-URI in order to facilitate direct mapping of the subscriber's ID between the disparate SIP and iDEN network domains, without requiring the use of a separate name translation server. Note that this extension also applies to all subsequent requests within the same SIP dialog that are initiated by the same user agent as the INVITE, as well as the responses thereto. For all subsequent requests within the same SIP dialog that are initiated by the recipient of the INVITE, the From header contains the target subscriber's private number (this applies to applicable INFO and BYE requests only).

An example of the syntax of the extended From header 45 is given below.

From: 123*45*678@carrier.com; tag=abc123

The 123*45*678 depicts the extended value of field 46.

The SIP INVITE 40 To header 47 is extended to include the originating subscriber's private number, which is used as their address within the iDEN system. This information is provided in the username information field (user id) 48 of the associated SIP-URI in order to facilitate direct mapping of the subscriber's ID between the disparate SIP and iDEN network domains, without requiring the use of a separate name translation server. The syntax is defined below. Note that this extension also applies to all subsequent requests within the same SIP dialog that are initiated by the same user agent as the SIP INVITE, as well as the responses thereto. For all subsequent requests within the same SIP dialog that are initiated by the recipient of the INVITE, the To header 47 includes the originating subscriber's private number (this applies to applicable INFO and BYE requests only).

An example of the syntax of the extended To header is given below.

To: 123*45*678@carrier.com; tag=987xyz

The 123*45*678 depicts the extended value of field 47.

There are two extensions to the SIP INVITE 40 Contact header 49 field. First, similar to the extension described for request-line 41, the SIP INVITE 40 Contact header field 49 contains a username information field (user id) 50 that includes the same field of information 42 as the request line 41. The form user_id.non_sip_server_id facilitates direct routing of future requests to the target call server (which is not SIP enabled), without requiring a separate routing table lookup. In the 3G gateway 30, the non_sip_server_id is the ISDN address of the dispatch call server that is serving the target subscriber. Note that this extension also applies to SIP 200 OK responses to INVITE requests.

Second, a new cache flag 51 is added as an extension parameter to indicate that the receiving server should store the associated Contact address for use in future calls to the subscriber identified in the associated From header 45 user id field 46. When used in conjunction with the user information naming convention described above, this facilitates direct routing of future calls from any originating subscriber to the applicable target server (which is not SIP enabled), without requiring a subscriber database query or a complex routing table lookup. Note that this extension also applies to SIP 200 OK responses to INVITE requests, in which case the applicable subscriber is identified in the associated To header 47 user id field 48.

Examples of the syntax of the extended Contact header are given below.

Contact: 123*45*678.14805551212@192.123.12.3

The 123*45*678.1480555121 depicts the extended value of field 50.

Contact: john.doe@carrier.com;cache
Contact:    123*45*678.14805551212@192.123.12.3; cache The "cache" field 51 indicates that the receiving server should store the value of the contact header 49.

The User-Agent header 53 includes a product field 39 that includes an extension value of "vsgw" and a product-version field 54 that has an associated interface-version. This extension facilitates the negotiation of the interface version that will be used for the associated SIP dialog.

Examples of the syntax of the extended User-Agent header are given below.

User-Agent: vsgw/R.02.01.00/R02.02.00
User-Agent: pcclient/R.02.01.00

The "vsgw" is the extended value of the product field 39. The R.02.01.00 and R02.02.00 depict extended values of the product-version field 54.

The SIP INVITE request 40 includes a Content-type header 55, which has a media-type field 56. If the Message body 57 contains only a single application part comprising iGW specific Call Processing information, then the media-type field 56 contains the extension value "application/x-iGW-CP".

An example of the syntax of the extended Content-type header is given below.

Content-Type: application/x-iGW-CP

The Message body 57 in the SIP INVITE request 40 includes an iGW Call Processing type extension field (x-iGW-CP) 58. The x-iGW-CP message body field contains a Call Type parameter, and may optionally include the following parameters: Billing Call Reference ID, Priority, Service Area ID, Sector ID, EBTS ID and/or MS Status Code. Note that if the x-iGW-CP field 58 is part of a multipart message body, then associated Content-Type and Content-Length headers must also be present in the message body 57, in accordance with the multipart message body syntax defined in RFCs 2045 and 2046.

Additionally, for some dispatch call types, the SIP INVITE request 40 message body 57 also includes an second body-part that comprises an extended version of the Session Description Protocol (i.e., designated by an "application/sdp" SD content type) 59. See FIG. 3 for details. If both message body types are included, then they are encapsulated in a multipart message body. In this case, the SIP INVITE 40 Content-Type header 55 contains the value "multipart/mixed", in accordance with RFC 2045 and RFC 2046.

Figure 3:
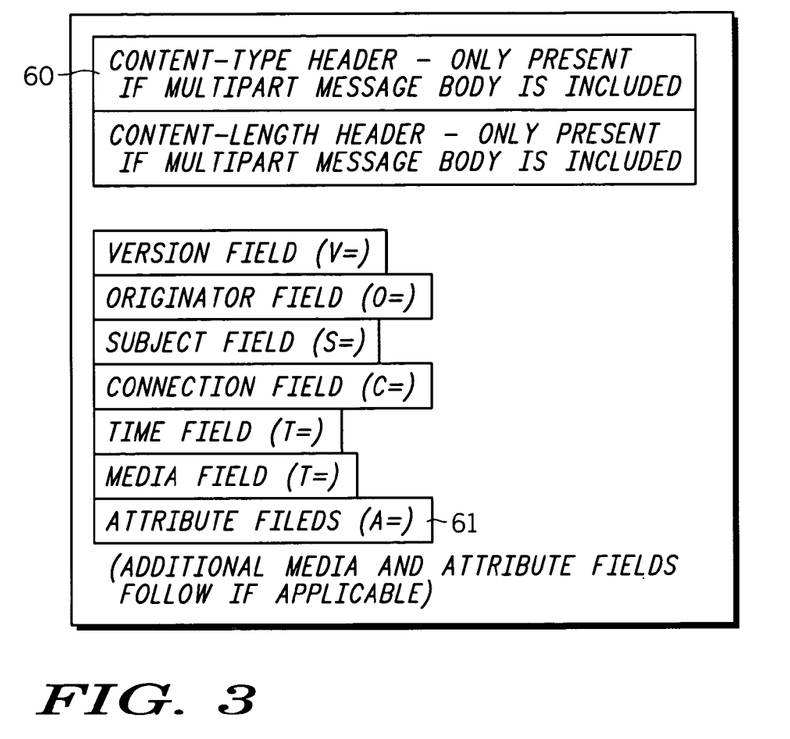
FIG. 3 is a data layout of a SDP message body in accordance with the present invention.

Referring to FIG. 3, the general structure of an RFC 2327 Session Description Protocol (SDP) message body is illustrated. Note that the Content-type and Content-length headers are not part of SDP; rather, they are included here to reflect the possible use of a multipart message body in accordance with RFCs 2045 and 2046. The Content-type header 60 employs the same general syntax as the Content-type header 55 discussed above (without extension).

For the Attribute field 61, the present invention includes several independent and optional media attribute extensions to the standard SDP message body.

First, a new attribute 61 "a=recvssrc" is defined to indicate that the recipient must suppress the standard SSRC identifier allocation and collision mitigation functionality defined in RFC 1889—Real-time Transport Protocol (RTP), and use the provided SSRC value in all applicable RTP packets. This extension applies to the SDP message body that constitutes the "offer" half of the standard SIP "offer/answer" model. The syntax of this attribute 61 is shown below by example.

a=recvssrc:ffeeddcc

A new parameter "rate_reduc" is defined for the "a=fmtp" media attribute 61. This attribute 61 is used to override the standard mode for Selectable Rate Vocoder (SMV—a family of vocoders) or the standard rate reduction pattern for Enhanced Variable Rate Codecs (EVRC—a family of vocoders), thereby reducing the required media bandwidth for the associated call. An example of the rate_reduc parameter is described below.

a=fmtp:98 maxinterleave=0 rate_reduc=0

The Attribute field 61 may also include an allowable value range for packet times defined by the "a=ptime" and "a=maxptime" media attributes, which have been optimized for each applicable vocoder type to improve voice quality. Examples are shown below.

a=ptime:20
    a=ptime:25.375
    a=maxptime:100

Two new encoding names have been added for use in the attribute field 61 "a=rtpmap" attributes: X-VSELP_I6 and X-AMBE++_I6, both using a clock rate of 8000. Examples are shown below.

a=rtpmap:97 X-VSELP_I6/8000
    a=rtpmap:98 X-AMBE++_I6/8000

Figure 4:
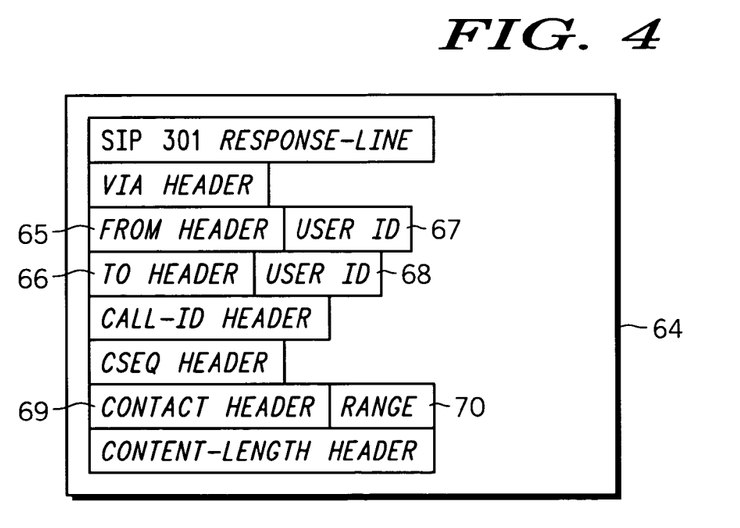
FIG. 4 is a data layout of a SIP 301 INVITE response in accordance with the present invention.

The structure of the SIP 301 INVITE response 64 is illustrated in FIG. 4. From header 65 and To header 66 are extended with user information extensions 67 and 68 similarly to the From header 45 and To header 47 and respective extensions 46 and 48.

A contact-extension parameter 70 "range" has been added to the Contact header 69 to facilitate the dynamic configuration of applicable routing information (e.g., a routing table) at the receiving server. An example is shown below.

Contact: 123*45*678@carrier.com;range=100, 1000, 50, 200

Figure 5:
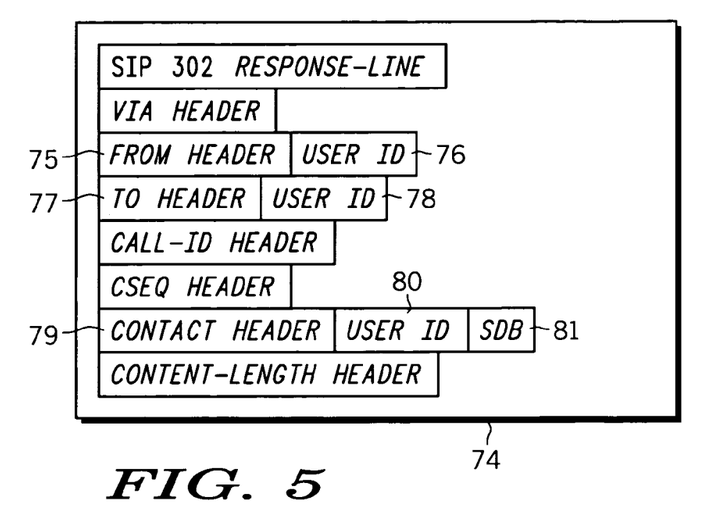
FIG. 5 is a data layout of a SIP 302 INVITE response message in accordance with the present invention.

The structure of the SIP 302 INVITE Response 74 is illustrated in FIG. 5. From header 75 and To header 77 are extended with user information extensions 76 and 78 similarly to the From header 45 and To header 47 and respective extensions 46 and 48.

There are extensions in the SIP 302 INVITE Response structure 74 to the Contact header 79. These extensions are similar to, and used in conjunction with, extensions 42 and 43 explained above in FIG. 2. These extensions are user id 80, and the sdb 81 field.

First, a user information field (user id) 80 of the associated URI address may include a username of the form user_id-.non_sip_server_id to facilitate direct routing to a target server that is not SIP enabled, without requiring a separate routing table lookup. For the gateway 30 implementation, the non_sip_server_id portion of field 80 is the ISDN (Integrated Services Digital Network) address (e.g., telephone number) of the dispatch call server that is serving the target subscriber.

Second, an extension of a sdb flag 81 (subscriber database) is added. This parameter acts as a flag to indicate that the associated non_sip_server_id portion of field 80 was determined via a query to the applicable subscriber database (e.g., the target subscriber's HLR (home location register)) on this call attempt.

This implies that a preceding database query triggered this SIP 302 redirect message, which will result in a subsequent INVITE request. The sdb parameter is used to override normal cache precedence rules, eliminate unnecessary additional subscriber database queries, and mitigate SIP redirect loops.

An example of the syntax for the first and second extensions follows.

Contact: 123*45*678.14805551212@carrier.com;sdb

Figure 6:
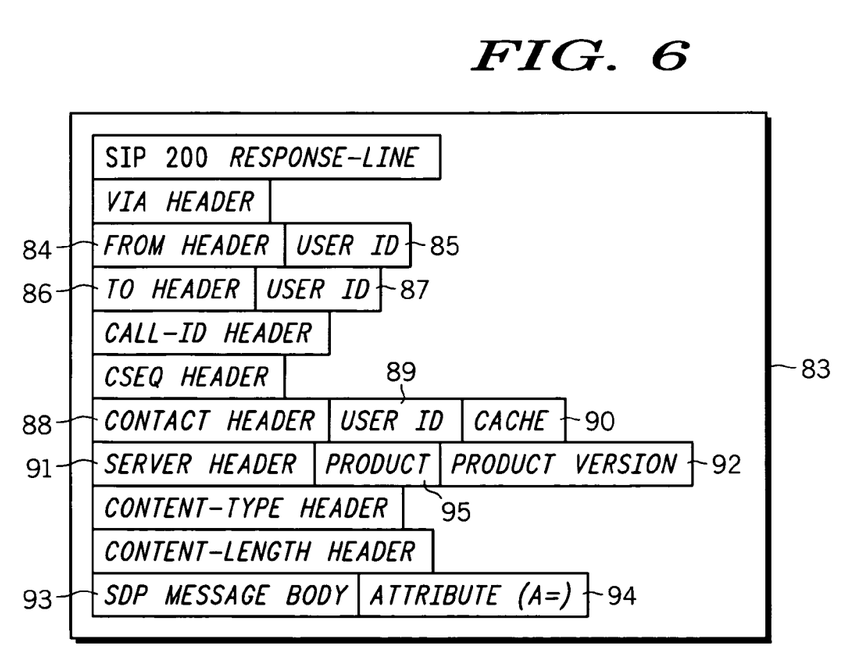
FIG. 6 is a data layout of a SIP 200 INVITE response message in accordance with the present invention.

Referring to FIG. 6, the structure of the SIP 200 (INVITE) response 83 is illustrated. Only the extended fields will be explained for this message. For each information element that has been extended by this invention, reference numerals are used to explain the extended fields.

The From header 84 is extended by field 85 which is a user id field. The user id field 85 is the same field as the user id field 46 of From header 45 and is explained above with reference to FIG. 2.

Similarly, the To header 86 is extended by field 87 which is a user id field. The user id field 86 is the same field as the user id field 48 of To header 47 and is explained above with reference to FIG. 2.

The Contact header 88 is extended by fields 89 and 90, which include the user id field 89 and the "cache" field 90. The user id field 89 is the same field as the user id field 50 of Contact header 49 and is explained above with reference to FIG. 2. Further, the "cache" field 90 is the same and has a similar explanation to "cache" field 51 of FIG. 2.

Similar to the User-Agent header 53 described above, the Server header 91 contains a product field 95 that includes an extension value of "vsgw" and a product-version field 92 that contains an associated interface-version. This extension facilitates the negotiation of the interface version that will be used for the associated SIP dialog. The extended Server header 91 is used in conjunction with the extended User-Agent header 53. Further, the explanation of product field 95 and product-version field 92 are the same as those defined in fields 39 and 54 of the SIP INVITE Request 40 shown in FIG. 2.

Examples of the syntax of the extended Server header are given below.

Server: vsgw/R.02.01.00/R02.02.00

Server: pcclient/R.02.01.00

The "vsgw" is the extended value of the product field 95.

The R.02.01.00 and R02.02.00 depict extended values of the product-version field 92.

For SDP message body 93, its explanation is the same as that shown in FIG. 3. The attribute field 94 has the same explanation as attribute field 61 of FIG. 3.

Figure 7:
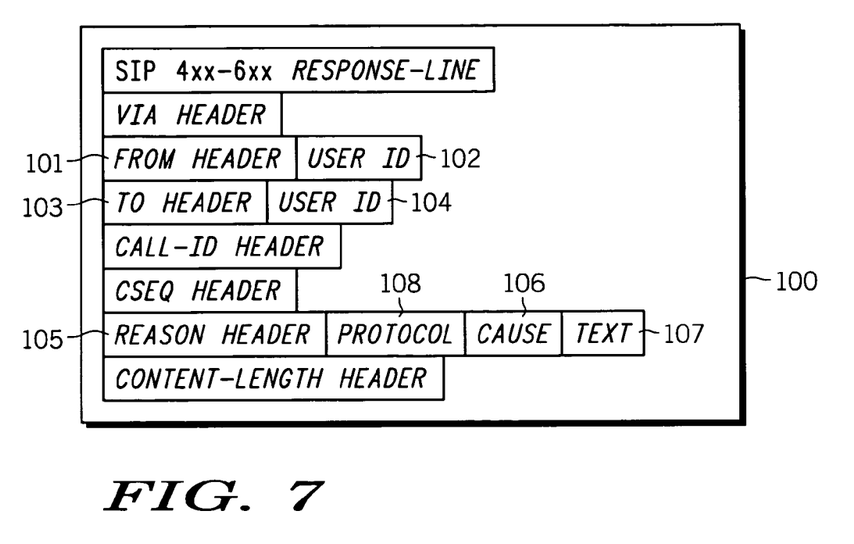
FIG. 7 is a data layout of SIP 4XX–6XX INVITE response messages in accordance with the present invention.

Referring to FIG. 7, the data structure of SIP 4XX-6XX INVITE Responses 100 are illustrated. Only the extended fields will be explained for this message. For each information element that has been extended by this invention, reference numerals are used to explain the extended fields.

The From header 101 is extended by field 102, which is a user id field. The user id field 102 is the same field as the user id field 46 of From header 45 and is explained above with reference to FIG. 2.

Similarly, the To header 103 is extended by field 104 which is a user id field. The user id field 103 is the same field as the user id field 48 of To header 47 and is explained above with reference to FIG. 2.

The SIP Reason header 105 is extended beyond the standard specification provided in RFC 3326, being employed in SIP 4xx-6xx responses with extended values defined for the protocol field 108, the cause field 106 and the text field 107.

An example is shown below.

Reason: PgRsp; cause=2; text="iDEN Target Status: 0600"

Figure 8:
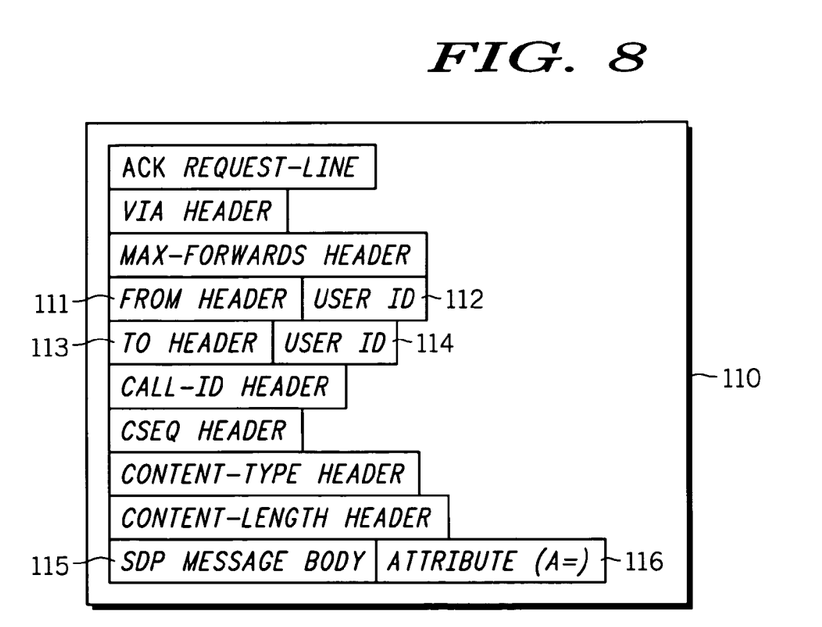
FIG. 8 is a data layout of a SIP ACK request in accordance with the present invention.

Referring to FIG. 8, the structure of the SIP ACK Request 110 and its extensions are illustrated. Only the extended fields will be explained for this message. For each information element that has been extended by this invention, reference numerals are used to explain the extended fields.

The From header 111 is extended by field 112, which is a user id field. The user id field 112 is the same field as the user id field 46 of From header 45 and is explained above with reference to FIG. 2.

Similarly, the To header 113 is extended by field 114, which is a user id field. The user id field 114 is the same field as the user id field 48 of To header 47 and is explained above with reference to FIG. 2.

The SDP message body field 115 is shown in the SIP ACK Request structure 110 and is the same as SDP Message Body field 93 shown in FIG. 3. The attribute field 116 of field 115 has the same explanation as attribute field 61 of FIG. 3, except that the "a=recvssrc" field 116 does not apply in the ACK Message body 115.

Figure 9:
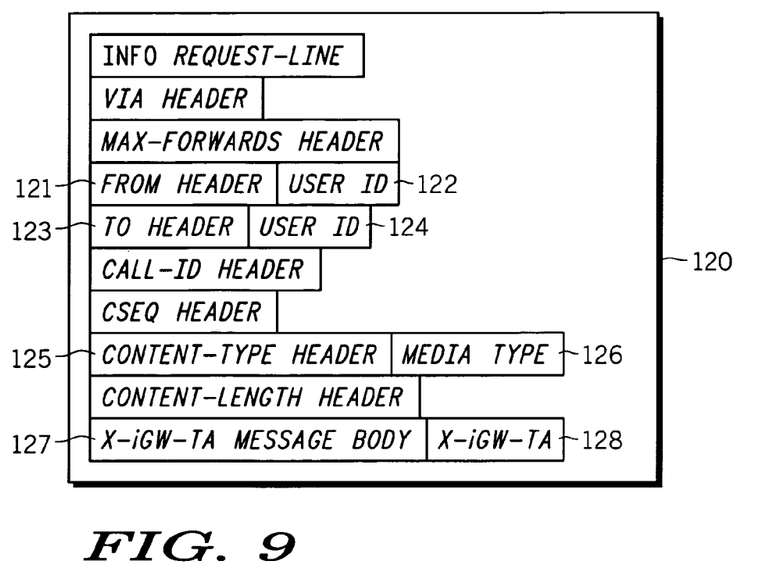
FIG. 9 is a data layout of a SIP INFO request in accordance with the present invention.

Referring to FIG. 9, the structure of the SIP INFO Request 120 and its extensions are illustrated. Only the extended fields will be explained for this message. For each information element that has been extended by this invention, reference numerals are used to explain the extended fields.

The From header 121 is extended by field 122, which is a user id field. The user id field 122 is the same field as the user id field 46 of the From header 45 or the user id field 48 of the To header (depending on message direction relative to the INVITE request). Fields 46 and 48 are explained above with reference to FIG. 2.

Similarly, the To header 123 is extended by field 124, which is a user id field. The user id field 124 is the same field as the user id field 48 of To header 47 or the user id field 46 of the From header 45, which are explained above with reference to FIG. 2.

Referencing FIG. 9 again, there is further a Content-Type header 125 in the SIP INFO Request message structure 120, which has a media-type field 126. The media-type field 126 of the SIP INFO request Content-Type header 125 may have an extension value "application/x-iGW-TA" to indicate the message contains a defined iGW Talker Arbitration type message body. An example of the syntax of the extended Content-type header 125 is given below.

Content-Type: application/x-iGW-TA

The SIP INFO request 120 further has a Message body 127 that comprises an extended Talker Arbitration field (x-iGW-TA) 128. The x-iGW-TA field 128 in the SIP INFO request 120 includes a TA message type parameter. Additionally, for some TA message types, the message body 127 also has a message payload parameter. Examples of the x-iGW-TA field syntax are depicted below:

1) TA=2: Floor Request
2) TA=1 timestamp:07d30b04010e1e140064
3) TA=3: Floor Granted user:<sip:55*55*121212@nextelgateway.com For examples 2 and 3 above, the timestamp and user payload parameters are included in the message body 127.

Figure 10:
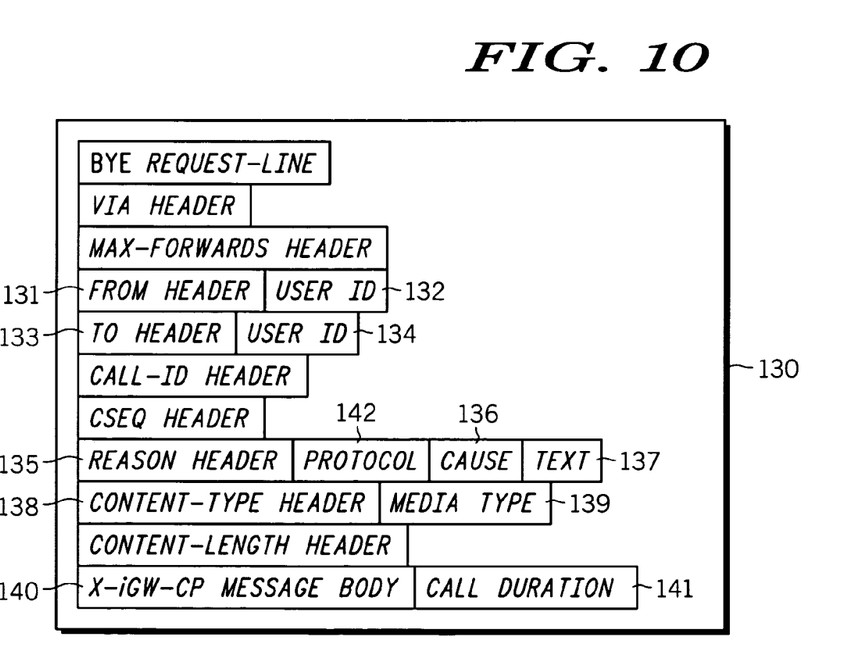
FIG. 10 is a data layout of a SIP BYE request in accordance with the present invention.

Referring to FIG. 10, the data structure of the SIP BYE Request 130 and its extensions are illustrated. Only the extended fields will be explained for this message. For each information element that has been extended by this invention, reference numerals are used to explain the extended fields.

The From header 131 is extended by field 132, which is a user id field. The user id field 132 is the same field as the user id field 46 of From header 45 or the user id field 48 of the To header (depending on message direction relative to the INVITE request). Fields 46 and 48 are explained above with reference to FIG. 2.

Similarly, the To header 133 is extended by field 134, which is a user id field. The user id field 134 is the same field as the user id field 48 of To header 47 or the user id field 46 of the From header 45, which are explained above with reference to FIG. 2.

In the SIP BYE Request message structure 130, there is also a Reason header 135, which is extended beyond the specification provided in RFC 3326, The Reason Header for the Session Initiation Protocol (SIP). Specifically, the Reason Header 135 employs extended values for the protocol field 142, the cause field 136 and the text field 137. An example of the use of these fields is given below.

Reason: Term; cause=2; text="abort/D2V:0200"

The SIP BYE request 130 has a Content-Type header 138, which has a value in the media-type field 139 of "application/x-iGW-CP" to indicate that the message contains an iDEN gateway 30 specific call processing type message body 140. The same value is used in field 139 as in the media-type field 56 described above in FIG. 2.

The SIP BYE request 130 also includes an extended iGW Call Processing (CP) type application message body (x-iGW-CP) 140. The x-iGW-CP message body 140 in the BYE request 130 contains a call duration parameter 141. The call duration parameter 141 indicates the length of the associated call. An example of the call duration field 141 is given below.

Call duration=41000

The bearer protocol defined by this invention uses the Real-time Transport Protocol (RTP), as documented in RFCs 1889 and 1990. Appropriate extensions are included to specify new RTP Payload Formats for bearer traffic that utilizes VSELP I6 or AMBE++ I6 vocoders.

The above described call signaling protocols facilitate the IDEN network call services to external networks such as 3G networks. These protocols provide User Agent services for extending iDEN network services such as dispatch and push-to-talk.

Although the preferred embodiment of the invention has been illustrated, and that form described in detail, it will be readily apparent to those skilled in the art that various modifications may be made therein without departing from the spirit of the present invention or from the scope of the appended claims.

The invention claimed is:

1. A computer-readable medium for storing an interface call signaling protocol for a communication system using an internet protocol (IP), the computer-readable medium comprising:
   an INVITE request field stored in the computer-readable medium;
   the INVITE request field including:
      a user identification extension having direct routing information;
      a server identification extension having a network address; and
      a subscriber data base flag for indicating the user identification extension and the server identification extension were obtained in response to a query to an applicable subscriber database.

2. The computer-readable medium as claimed in claim 1, wherein there is further included:
   a from header field stored in the computer-readable medium, the from header field including:
      a user identification extension having direct routing information; and
      a server identification extension having a network address.

3. The computer-readable medium as claimed in claim 1, wherein there is further included:
   a to header field stored in the computer-readable medium, the to head field including:
      a user identification extension having direct routing information; and
      a server identification extension having a network address.

4. The computer-readable medium as claimed in claim 1, wherein there is further included:
   a contact header field stored in the computer-readable medium, the contact header field including:
      a user identification extension having direct routing information;
      a server identification extension having a network address; and
      a cache flag for indicating the user identification extension and the server identification extension are to be stored.

5. The computer-readable medium as claimed in claim 1, wherein there is further included:
   a user agent field stored in the computer-readable medium, the user agent field including:
      a product extension indicating "voice signaling gateway"; and
      a product version extension.

6. The computer-readable medium as claimed in claim 1, wherein the INVITE request field is part of an INVITE message, and wherein there is further included a content header field stored in the computer-readable medium, the content header filed including a media type extension identifying the identifying the INVITE message as a multi-part message.

7. The computer-readable medium as claimed in claim 6, wherein the INVITE request field is part of an INVITE message stored in the computer-readable medium, and wherein there is further included in the computer-readable medium a message body field including a call processing type media type extension identifying the INVITE message as a multi-part message.

8. The computer-readable medium as claimed in claim 1, wherein the INVITE request field is part of an INVITE message, and wherein there is further included a message body field stored in the computer-readable medium, the message body field including a call processing type media type extension identifying the INVITE message as a multi-part message.

9. The apparatus computer-readable medium as claimed in claim 1, wherein:
   the internet protocol includes session initiation protocol (SIP); and
   the INVITE request field is a modified SIP INVITE request field for a SIP INVITE request.

10. The computer-readable medium as claimed in claim 1, wherein for the internet protocol of a session description protocol when a message body indicates a multi-part message, there is further included an attribute extension for a session description protocol.

11. The computer-readable medium as claimed in claim 1, wherein there is further included:
   a via header field;
   a maximum forwards header field;
   a call identification header field;
   a Cseq header; and
   a content length header.

12. The computer-readable medium as claimed in claim 1, wherein the INVITE request field is part of an INVITE message stored in the computer-readable medium, the INVITE message including a message body, and wherein there is further included in the computer-readable medium a content type header field, the content header field including a media type extension identifying the application type of the message body.

13. A computer-readable medium for storing an interface call signaling protocol for a communication system using an internet protocol (IP), the computer-readable medium comprising:
   an INVITE response field;
   a from header field including:
      a user identification extension having direct routing information;
      a server identification extension having a network address; and a contact header including:
      a user identification extension having direct routing information;
      a server identification extension having a network address; and
      a subscriber data base flag for indicating the user identification extension and the server identification extension were obtained in response to a query to an applicable subscriber database.

14. A computer-readable medium for storing an interface call signaling protocol for a communication system using an internet protocol (IP), the computer-readable medium comprising:
   an INVITE response field;
   a from header field including:
      a user identification extension having direct routing information;
      a server identification extension having a network address; and a contact header including:
      a user identification extension having direct routing information;

a server identification extension having a network address; and a cache flag for the user identification extension and the server identification extension are to be stored.

15. A computer-readable medium for storing an interface call signaling protocol for a communication system using an internet protocol (IP), the computer-readable medium comprising:

an INVITE response field;

a from header field including:
   a user identification extension having direct routing information;
   a server identification extension having a network address; and a server header field including a product extension and a product version extension for interfacing purposes.

* * * * *